United States Patent
Watase

(10) Patent No.: US 8,059,306 B2
(45) Date of Patent: Nov. 15, 2011

(54) SYSTEM AND METHOD FOR CONTROLLING PRINT DEVICE

(75) Inventor: Shinichiro Watase, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 1223 days.

(21) Appl. No.: 11/796,034

(22) Filed: Apr. 26, 2007

(65) Prior Publication Data
US 2007/0252857 A1    Nov. 1, 2007

(30) Foreign Application Priority Data
Apr. 27, 2006   (JP) .................. 2006-123532

(51) Int. Cl.
*G06K 15/02*   (2006.01)

(52) U.S. Cl. ............. 358/1.2; 358/1.9; 358/523; 347/15

(58) Field of Classification Search .............. 347/15, 347/43; 358/1.2, 1.9, 1.16, 523
See application file for complete search history.

(56) References Cited

U.S. PATENT DOCUMENTS

| 5,724,503 | A | 3/1998 | Kleinman | |
|---|---|---|---|---|
| 2004/0212829 | A1 | 10/2004 | Uchida | |
| 2004/0213614 | A1 | 10/2004 | Uchida | |
| 2005/0157321 | A1* | 7/2005 | Alacar | 358/1.13 |
| 2006/0146368 | A1 | 7/2006 | Uchida | |

FOREIGN PATENT DOCUMENTS

| JP | 1997-26 924 | 1/1997 |
|---|---|---|
| JP | 2004-326 603 | 11/2004 |
| JP | 2004 326601 | 11/2004 |

* cited by examiner

*Primary Examiner* — Lamson Nguyen

(57) ABSTRACT

A method, program product, and system for controlling a print device which helps minimizing effects which a failure of a plug-in module for adding a function of a printer driver may cause to the printer driver body and other plug-in modules The print device control system includes a data processing device and a plug-in server. The data processing device has a printer driver embedded thereon. The plug-in server has plug-in modules for executing an add-function of the printer driver, and executes, according to a request from the printer driver, the plug-in module corresponding to the request, and returns processed data to the printer driver. The plug-in server is configured as a process different from the printer driver. The printer driver returns the processed data to the data processing device through a memory with the data processing system.

16 Claims, 3 Drawing Sheets

```
<PrinterPlugInConfig>
<Printer name = "Printer1">
 <PlugIn name = "BannerPage">
  <InsertPosition value = "StartDoc" />
  <Image filename = "BannerImage1.tif" />
 </PlugIn>
 <PlugIn name = "HeaderFooter1">
  <String content = "Date: date   User: user " position = "bottom" align = "right" />
 </PlugIn>
</Printer>
<Printer name = "Printer2">
 <PlugIn name = "HeaderFooter1">
  <String content = "Date: date   User: user " position = "bottom" align = "right" />
 </PlugIn>
</Printer>
</PrinterPlugInConfig>
```

FIG. 2

SYSTEM AND METHOD FOR CONTROLLING PRINT DEVICE

FIELD OF THE INVENTION

This invention relates to a system and a method for controlling a print device, in particular to a print device control system in which a plug-in server has a plug-in module for executing a new function to be added to the printer driver, instead of the module being installed onto the printer diver.

BACKGROUND OF THE INVENTION

For a PC (Personal Computer) and the like, print data is created with application software after converting the data into data which can be interpreted by a print device at a printer driver.

The printer driver includes many additional functions such as minimizing multiple pages of data to fit in one single page and providing a binding space for book biding. As a part of such additional functions, the printer driver can also add a new function as needed.

Japanese Patent Laid-Open No. 2004-326601 discloses a method of adding a new function. According to the patent application document, a configuration of embedding a plug-in module which provides a new function in a printer driver enables executing a desired printing job by adding a necessary printer driver as needed.

More specifically, a print control device disclosed in the patent application document can add, update, and/or delete a function by using the plug-in module connected to a driver module itself.

Accordingly, the print control device acquires function data which covers a search range written in a search data list in a search data list UI control module which operates with a host PC and write the acquired data in a function data list. The print control device, then, displays a part of the function data written in the list in a display area on a function configuration screen and receives an instruction of adding, updating, and deleting a function corresponding to the displayed function data. According to the received instruction, the print control device executes add, update, and deletion of the function.

However, the print control device disclosed in the patent application document and other conventional technologies complicate a design and enlarges a scale of the printer driver thereby increase memory use by embodying a plug-in module in the printer diver to add functions therein. Additionally, since the plug-in modules operate as a part of the printer driver or as a single process, a crush of the plug-in module, if happens, halts operation of the whole driver.

Furthermore, since the plug-in module uses the same memory area as the printer driver does, a buffer overrun, if happens, may destroy the memory area the printer driver and/or another plug-in module use(s). The risk of the problem becomes higher with a less reliable program, such as of a plug-in module created by the user to add a function as needed.

SUMMARY OF THE INVENTION

The present invention addresses such issues by installing a plug-in server in addition to the printer driver embedded in the data processing device. The plug-in server has plug-in modules for executing an additional function of the printer driver, executes, in response to a request from the printer driver, the module corresponding to the request, and returns the processed data to the printer driver.

More specifically, the present invention intends to minimize effects which a failure of a plug-in module for adding a function of a printer driver may cause to the printer driver body and other plug-in modules.

According to a first aspect of the present invention, in order to solve abovementioned issues, the system for controlling a print device includes a data processing device and a plug-in server. The data processing device has a print driver installed thereon. The plug-in server has plug-in modules for executing an additional function of the printer driver, and executes, in response to a request from the printer driver, the plug-in module corresponding to the request and returns processed data to the printer driver.

In the system for controlling a print device according to a second aspect of the present invention, according to the first aspect, the plug-in server constitutes a process separate from the printer driver, designed by a program installed on the data processing device.

In the system for controlling a print device according to a third aspect of the present invention, according to the first or the second aspect, the printer driver returns the processed data to the data processing device through a memory shared with the data processing device.

The printer driver according to a fourth aspect of the present invention directs the data processing device to perform the following steps. The data processing device receives a print command which requires the additional function from an application, directs the plug-in server which has the plug-in module for executing the additional function to execute a processing for the additional function, and receives the processed data.

The system for controlling a print device according to a fifth aspect of the present invention, according to the fourth aspect, directs the data processing device to execute the step of receiving the processed data through the shared memory.

These and other objects, features and advantages of the present invention are specifically set forth in or will become apparent from the following detailed descriptions of the invention when read in conjunction with the accompanying drawings.

DESCRIPTION OF THE DRAWINGS

FIG. 2 is an example of a configuration file.

DETAILED DESCRIPTION OF THE INVENTION

The system and the printer driver for controlling a print device of the present invention present the following effects.

According to the first aspect of the present invention, the system embodies the plug-in server separate from the printer driver. The plug-in server has plug-in modules which execute an additional function of the printer driver, executes, in response to a request from the printer driver, the plug-in module corresponding to the request, and returns processed data to the printer driver.

The system, therefore, can minimize an undesirable effect caused by a plug-in module for adding a function, if the module fails, to the printer driver body and other plug-in modules.

In the system for controlling a print device according to the second aspect of the present invention, according to the first aspect, the plug-in server constitutes a process separate from the printer driver, designed by the program installed on the data processing device. Therefore, a function of the plug-in server can be used in the single data processing device.

Furthermore, in the system for controlling a print device according to the third aspect of the present invention, according to the first or the second aspect, the printer driver returns processed data to the data processing device through the shared memory. This configuration enables easy transmission and reception of the processed data.

Furthermore, according to the fourth aspect of the present invention, when receiving a print command which requires the additional function from an application, the data processing device directs the plug-in server which has the plug-in module for executing the add-function to execute a processing for the additional function and receives the processed data. Therefore, even if the plug-in module for adding a function experiences a problem, the printer driver will less likely be affected by the problem.

Yet furthermore, according to the fifth aspect of the present invention according to the fourth aspect, the data processing device executes the step of receiving the processed data through the shared memory. The configuration results easy reception and transmission of processed data.

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

Figure 1:
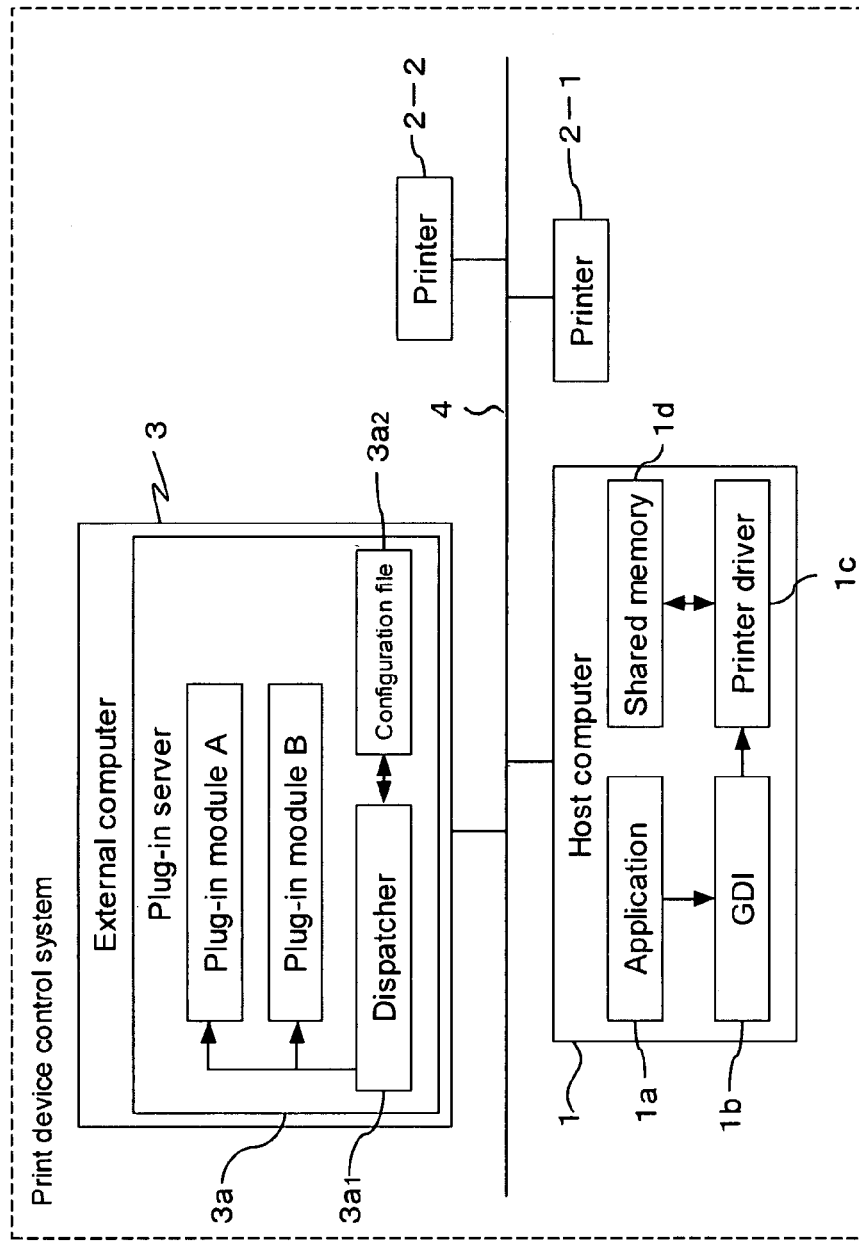
FIG. 1 is a block diagram illustrating a schematic configuration of a preferred embodiment of the present invention.

FIG. 1 is a block diagram illustrating a schematic configuration of a preferred embodiment of the present invention.

An application $1a$ operates on a host computer 1. The application $1a$ issues a description command to a printer driver $1c$ through a GDI (Graphic Device Interface) $1b$ of an OS (Operating System) on the host computer 1. The printer driver $1c$ interprets the description command issued by the application $1a$ into a printer language. Additionally, the printer driver $1c$ communicates through a LAN 4 with a plug-in server $3a$ which runs in an external computer 3.

Upon reception of a communication from the printer driver $1c$, the plug-in server $3a$ executes a plug-in function. Then, the plug-in server $3a$ executes a plug-in module corresponding to a printer identifier and a plug-in identifier transmitted from the printer driver $1c$.

The plug-in server $3a$ includes plug-in modules A and B, which are executed in the plug-in server $3a$.

The plug-in server $3a$ includes a dispatcher $3a_1$ and a configuration file $3a_2$ The dispatcher $3a_1$ and the configuration file $3a_2$ provide data on a plug-in module which the plug-in server $3a$ can run according to the request by the printer driver $1c$.

The configuration file $3a_2$ stores a table for the printer identifier and the plug-in identifier to correspond to each other, more specifically, a pair of data in the table constituted of a printer name, executable plug-in modules A and B, and operation configuration data of the each module.

Based on the data, the dispatcher $3a_1$ provides data on the executable plug-in module to the printer driver $1c$. The dispatcher $3a_1$ then verifies an execution request transmitted by the printer driver $1c$ with the data in the configuration file, selects either one of the plug-in modules A and B, and executes the processing.

For example, printers 2-1 and 2-2 are connected through the LAN 4. If the printer 2-1 performing a print job inserting a banner-page and footers, and the printer 2-2 performing a print job with footer insertion only, processings will be performed with a configuration file shown in FIG. 2. In FIG. 2, the printer 2-1 is identified as "Printer1" and the printer 2-2 as "Printer2."

Upon receiving a print job from the printer driver $1c$, the plug-in server $3a$ searches for configuration data and plug-in data of a corresponding printer through the configuration file of FIG. 2. If the appropriate configuration data is not found, any additional processing will not be performed. If the data is found, plug-in tags in the data will be executed in order. The following describes a detailed example when the corresponding printer is Printer1.

First, a processing for a "BannerPage" plug-in, which is configured with the plug-in tag, is executed by inserting the banner page in the first page of the document.

Next, an image of "BannerImage1.tif" is read from a hard disk and others to be inserted on the banner page.

Then, a processing for a "HeaderFooter1" plug-in, which is configured with the plug-in tag, is executed by inserting a date and a user name on the bottom of each page, aligned to the right.

Data is exchanged between the printer driver $1c$ and the plug-in server $3a$ through a shared memory $1d$ installed on the host computer 1.

For example, the shared memory $1d$ is used as follows. The printer driver $1c$ writes a depicted image in the shared memory $1d$. The plug-in module A or B run in the plug-in server $3a$ add a stamp and the like on the image.

Alternatively, data can be exchanged between the printer driver $1c$ and the plug-in server $3a$ with a disk file instead of the shared memory $1d$.

The printer driver $1c$ transmits data returned by the plug-in server $3a$ to the printers 2-1 and 2-2 to execute printing.

In addition to the abovementioned examples, the plug-in module can also execute other additional functions, such as water mark printing, overlap printing of stamps, print page count, temporary change of paper size and other items in print configuration.

Alternatively, if a plurality of host computers 1 are set up in the system, in order to process multiple print jobs, a plurality of plug-in servers $3a$ individually corresponding to each of the host computers 1 can be run.

The effects of such configuration will differ depending on processing ability of a hardware installed on the shared computer 3 on which the plug-in server $3a$ runs and resources essential for activating the plug-in server $3a$. Yet, the configuration certainly can prevent a fatal error induced by a print job from causing undesirable effects to the other print jobs. The system can also be configured for individual printer driver $1c$ to control starting and terminating of the each plug-in server $3a$.

When controlling operations in the abovementioned configuration, each of the printer drivers $1c$ can monitor a status of the corresponding plug-in server $3a$. If any problem is detected, the printer driver $1c$ can notify the user on the status. Alternatively, even when a single plug-in server $3a$ is shared, the printer driver $1c$ can monitor the status of the plug-in server $3a$ and notify the user on it.

Yet alternatively, depending on the content included in the configuration file $3a2$, the printer configuration data and the plug-in data which have not transmitted can be configured by the printer driver $1c$ to automatically execute themselves depending on the data in the configuration file $3a2$.

Since the data on the plug-in module and the printer configuration that are to automatically execute have been provided to the printer driver $1c$ in advance, an interface of the system can be designed in a way that the user can verify the data through the printer driver $1c$.

Yet alternatively, the external computer 3 on which the plug-in server 3a runs can be either solely for executing the plug-in server 3a or a separate individual computer also used for other purposes.

In an environment requiring a big scale and complicated processing, a desirable configuration will have the individual plug-in server 3a on the external computer 3 set up specifically for executing the plug-in server 3a.

Figure 3:
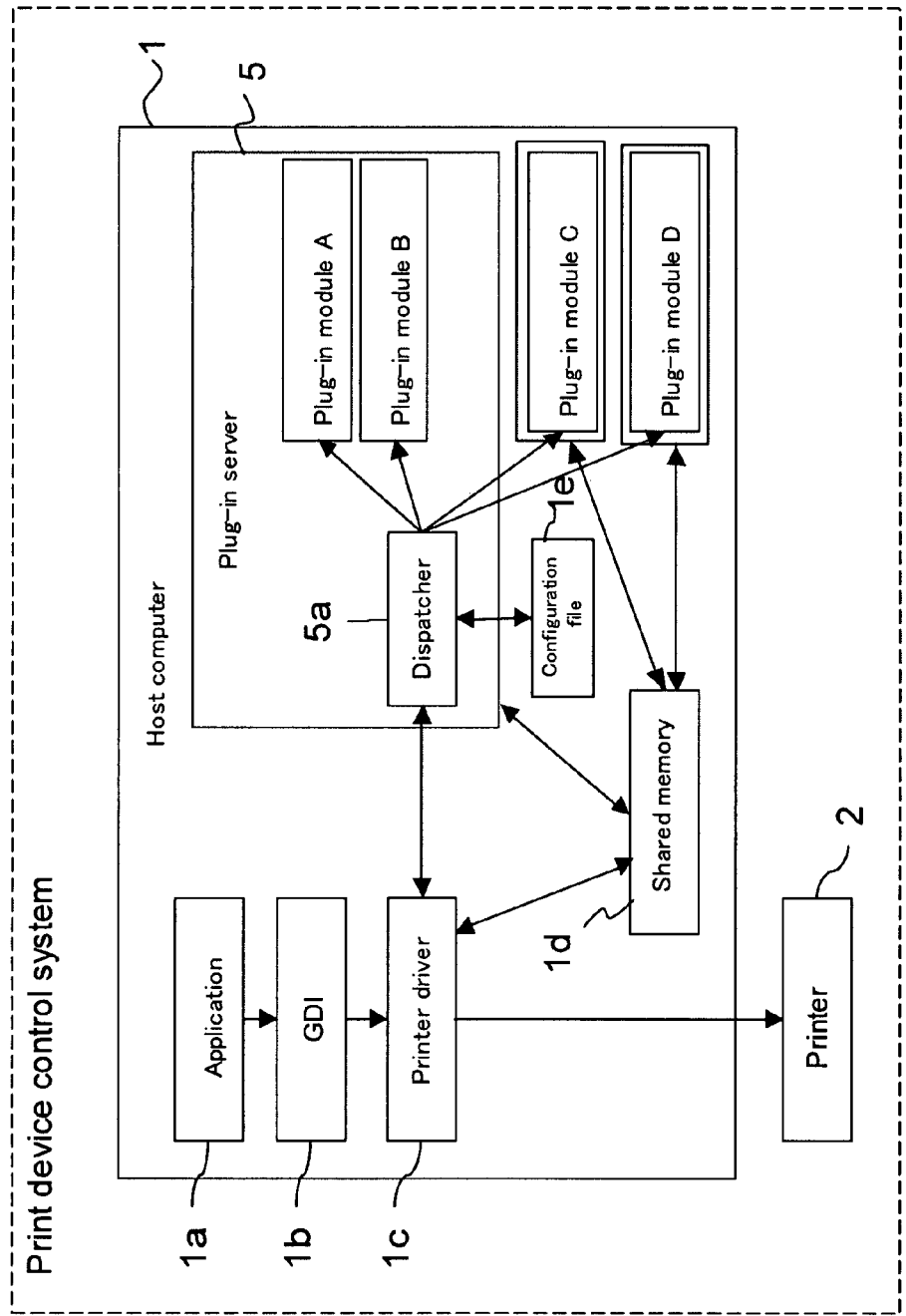
FIG. 3 is a block diagram illustrating a schematic configuration of a preferred embodiment of the present invention.

FIG. 3 is a block diagram illustrating a schematic design of a preferred embodiment of the present invention. In the preferred embodiment, the plug-in server 5 is installed on the host computer 1 as an independent and permanent service process.

The plug-in server 5 includes the plug-in modules A and B that are to be executed in the plug-in server 5 in an in-process mode. The plug-in server 5 can also direct plug-in modules C and D to execute the processing in an out-of-process mode. A configuration file 1e includes printer and plug-in data required for executing the processing.

The plug-in server 5 automatically starts running upon start of the OS on the host computer 1 and loads plug-in modules A and B by verifying with the data in the configuration file 1e and the like.

The plug-in server 5 executes the plug-in modules A and B or the plug-in modules C and D based on the printer and the plug-in data transmitted from the printer driver 1c.

Furthermore, the abovementioned preferred embodiments can be incorporated in the system together. In the case, the printer driver 1c receives data on an executable plug-in and a corresponding printer from the plug-in server 3a on the external computer 3 or the plug-in server 5 on the host computer 1 and directs either one of the plug-in servers 3a and 5 whichever can perform the processing selected by the user.

The present document incorporates by reference the contents of Japanese priority document, Japanese Patent Application No. 2006-123532, filed in Japan on Apr. 27, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A system for controlling a print device, comprising:
a data processing device embedded with a printer driver; and
a plug-in server which has plug-in modules for executing an additional function of the printer driver, and which executes, in response to a request from the printer driver, the plug-in module corresponding to the request and returns processed data to the printer driver, wherein the printer driver returns the processed data to the data processing device through a memory shared with the data processing device.

2. The system for controlling a print device of claim 1, wherein:
the plug-in server is configured as a process different from the printer driver.

3. The system for controlling a print device of claim 1, wherein:
the plug-in server runs in an external computer, and upon reception of a communication from the printer driver, the plug-in server executes a plug-in function, and the plug-in server executes a plug-in module corresponding to a printer identifier and a plug-in identifier transmitted from the printer driver.

4. The system for controlling a print device of claim 1, wherein:
the plug-in server comprises a dispatcher and a configuration file which provide data on a plug-in module which the plug-in server can run according to a request by the printer driver; and
the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

5. The system for controlling a print device of claim 1, wherein:
the plug-in server is installed on a host computer as an independent and permanent service process.

6. The system for controlling a print device of claim 1, wherein:
one embodiment of the plug-in server runs in an external computer, and upon reception of a communication from the printer driver, the plug-in server executes a plug-in function, and the plug-in server executes a plug-in module corresponding to a printer identifier and a plug-in identifier transmitted from the printer driver;
another embodiment of the plug-in server is installed on a host computer as an independent and permanent service process; and
the printer driver receives data on an executable plug-in and a corresponding printer from the embodiment of the plug-in server on the external computer and/or the embodiment of the plug-in server on the host computer, and directs one of the embodiments of the plug-in server whichever can perform a processing selected;
wherein each embodiment of the plug-in server comprises a dispatcher and a configuration file which provide data on a plug-in module which the plug-in server can run according to a request by the printer driver; and
the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

7. A method for controlling a print device, comprising steps of:
the data processing device receiving from an application a print command which requires the additional function;
the data processing device directing the plug-in server which has the plug-in module for executing the additional function to execute a processing for the additional function; and
the data processing device receiving the processed data, wherein the data processing device executes the step of receiving the processed data through a shared memory.

8. The method for controlling a print device of claim 7, wherein:
the plug-in server runs in an external computer, and upon reception of a communication from the printer driver, the plug-in server executes a plug-in function, and the plug-in server executes a plug-in module corresponding to a printer identifier and a plug-in identifier transmitted from the printer driver.

9. The method for controlling a print device of claim 7, wherein:

the plug-in server comprises a dispatcher and a configuration file which provide data on a plug-in module which the plug-in server can run according to a request by the printer driver; and the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

10. The method for controlling a print device of claim 7, wherein:

the plug-in server is installed on a host computer as an independent and permanent service process.

11. The method for controlling a print device of claim 7, wherein:

one embodiment of the plug-in server runs in an external computer, and upon reception of a communication from the printer driver, the plug-in server executes a plug-in function, and the plug-in server executes a plug-in module corresponding to a printer, identifier and a plug-in identifier transmitted from the printer driver;

another embodiment of the plug-in server is installed on a host computer as an independent and permanent service process; and the printer driver receives data on an executable plug-in and a corresponding printer from the embodiment of the plug-in server on the external computer and/or the embodiment of the plug-in server on the host computer, and directs one of the embodiments of the plug-in server whichever can perform a processing selected;

wherein each embodiment of the plug-in server comprises a dispatcher and a configuration file which provide data on a plug-in module which the plug-in server can run according to a request by the printer driver; and the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

12. A storage medium having stored thereon a printer driver which directs the data processing device to execute the steps of:

receiving from the application the print command which requires the additional function;

directing the plug-in server which has the plug-in module for executing the additional function to execute the processing for the additional function; and receiving the processed data, wherein the printer driver directs the data processing device to execute the step of receiving the processed data through a shared memory.

13. The storage medium of claim 12, wherein:

the plug-in server runs in an external computer, and upon reception of a communication from the printer driver, the plug-in server executes a plug-in function, and the plug-in server executes a plug-in module corresponding to a printer identifier and a plug-in identifier transmitted from the printer driver.

14. The storage medium of claim 12, wherein:

the plug-in server comprises a dispatcher and a configuration file which provide data on a plug-in module which the plug-in server can run according to a request by the printer driver; and the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

15. The storage medium of claim 12, wherein:

the plug-in server is installed on a host computer as an independent and permanent service process.

16. The storage medium of claim 12, wherein:

one embodiment of the plug-in server runs in an external computer, and upon reception of a communication from the printer driver, the plug-in server executes a plug-in function, and the plug-in server executes a plug-in module corresponding to a printer identifier and a plug-in identifier transmitted from the printer driver;

another embodiment of the plug-in server is installed on a host computer as an independent and permanent service process; and the printer driver receives data on an executable plug-in and a corresponding printer from the embodiment of the plug-in server on the external computer and/or the embodiment of the plug-in server on the host computer, and directs one of the embodiments of the plug-in server whichever can perform a processing selected;

wherein each embodiment of the plug-in server comprises a dispatcher and a configuration file which provide data on a plug-in module which the plug-in server can run according to a request by the printer driver; and the configuration file stores a table for a printer identifier and a plug-in identifier to correspond to each other, comprising a printer name, executable plug-in modules for a printer of the printer name, and operation configuration data of each module of the executable plug-in modules for a printer of the printer name.

* * * * *